(12) United States Patent
Okabe et al.

(10) Patent No.: US 7,287,890 B2
(45) Date of Patent: Oct. 30, 2007

(54) LAMP UNIT MOUNTING STRUCTURE

(75) Inventors: Toshiaki Okabe, Haibara-gun (JP);
Yasunobu Goto, Haibara-gun (JP);
Kentaro Nagai, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 142 days.

(21) Appl. No.: 10/864,425

(22) Filed: Jun. 10, 2004

(65) Prior Publication Data
US 2004/0252514 A1 Dec. 16, 2004

(30) Foreign Application Priority Data
Jun. 10, 2003 (JP) ............... 2003-165394

(51) Int. Cl.
*B60Q 1/26* (2006.01)
(52) U.S. Cl. ............... 362/548; 362/549; 362/496; 362/488; 362/490
(58) Field of Classification Search ............... 248/27.1, 248/27.3; 362/148, 368, 396, 496, 490, 548, 362/549, 547, 652, 655, 311, 487, 488
See application file for complete search history.

(56) References Cited

U.S. PATENT DOCUMENTS 4,340,795 A * 7/1982 Arthur ............... 200/295

| | | | |
|---|---|---|---|
| 6,543,918 B1 * | 4/2003 | Nagata | 362/488 |
| 6,749,324 B2 * | 6/2004 | Nagai et al. | 362/490 |
| 2002/0126495 A1 | 9/2002 | Nagata | |
| 2003/0026104 A1 | 2/2003 | Nagai et al. | |

FOREIGN PATENT DOCUMENTS

JP 2001-97112 A 4/2001

* cited by examiner

*Primary Examiner*—Thomas M. Sember
(74) *Attorney, Agent, or Firm*—Sughrue Mion, PLLC

(57) ABSTRACT

A lamp unit mounting structure includes a mounting panel having a mounting portion, a lamp unit, an elastic fixing member and a restricting member. The elastic fixing member is provided on the lamp unit, and includes a first portion which is extended from the lamp unit, a second portion which has a substantially U-shape, and has a first end being integrally connected to the first portion, a third portion which is extended from a second end of the second portion toward the lamp unit. The engagement portion engages the mounting portion of the mounting panel. The restricting member is provided on the lamp unit, and restricts a movement of the elastic fixing member in a mounting and dismounting direction of the engagement portion relative to the mounting panel. The restricting member has an escape portion which allows a movement of the elastic fixing member toward the lamp unit.

6 Claims, 12 Drawing Sheets

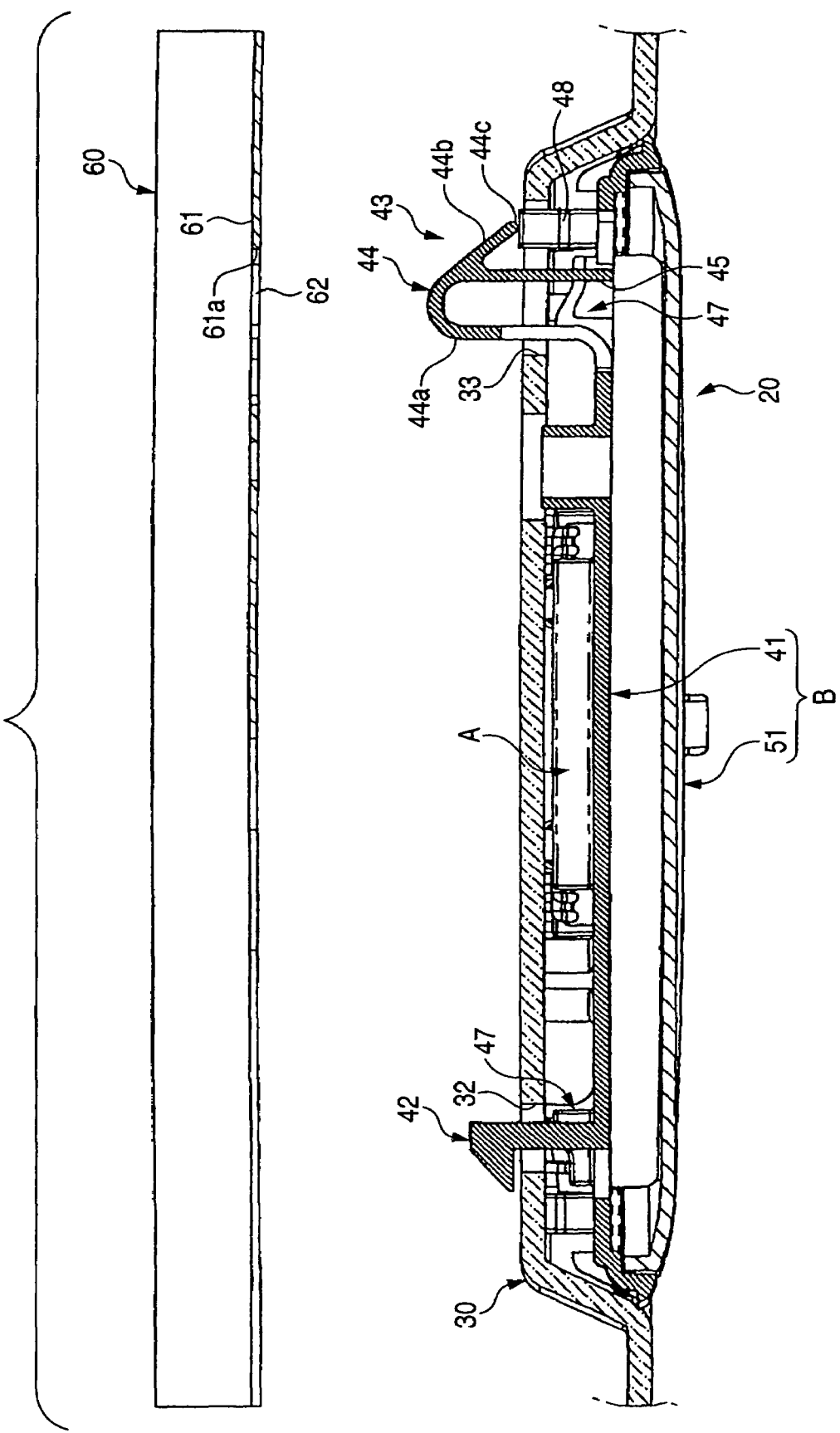

LAMP UNIT MOUNTING STRUCTURE

BACKGROUND OF THE INVENTION

This invention relates to a lamp unit mounting structure.

There has heretofore been proposed a lamp unit mounting structure of the type in which an interior wall member (covering a car body panel), such as a roof trim or a door trim, and a lamp unit, such as a room lamp or a courtesy lamp, are simultaneously fixed to the car body panel, thereby reducing the time and labor required for an assembling (fixing) operation in a car-assembling line (see JP-A-2001-97112).

FIG. 10 is a longitudinal cross-sectional view explanatory of a related room lamp-mounting structure disclosed in JP-A-2001-97112 or others. In the room lamp-mounting structure shown in FIG. 10, a room lamp 1 and a roof trim 2 are provisionally fixed to each other by a provisionally-fixing member 4, and also the room lamp 1 and a roof reinforcing member 3 of the car body are completely fixed to each other by a completely-fixing member 5. By doing so, the room lamp 1 and the roof trim 2 are simultaneously fixed to the roof reinforcing member 3.

The provisionally-fixing member 4 includes an engagement claw 14 formed at the room lamp 1, and an engagement portion 15 formed at the roof trim 2. The completely-fixing member 5, provided at the room lamp 1 and the roof reinforcing member 3, includes a spring 7 and a stopper 9 (both of which are provided at the room lamp 1), and a fixing portion 10 formed at an edge of a notch 13 formed in the roof reinforcing member 3.

As shown also in FIG. 11, the spring 7, formed of a metal sheet, includes an embedding portion 7a embedded horizontally in a lamp housing 11 of the room lamp 1, a first resilient deformation portion 7b extending obliquely upwardly from the embedding portion 7a and bent into a generally V-shape or a generally L-shape, a second resilient deformation portion 7c extending obliquely downwardly from the first resilient deformation portion 7b and bent into a generally inverted U-shape, and a claw portion 7d extending generally horizontally from the second resilient deformation portion 7c, and an operating portion 7e extending downwardly from the claw portion 7d and bent into a generally V-shape.

When the room lamp, having the above mounting structure, is to be fixed to an automobile, each engagement claw 14 on the room lamp 1 is engaged with the engagement portion 15 on the roof trim 2 to thereby provisionally fix the room lamp 1 and the roof trim 2 to each other by the provisionally-fixing member 4 before bringing the room lamp and the roof trim to a car-assembling line. Then, a roof sub-assembly (roof module), including the room lamp 1 and the roof trim 2 thus fixed together by the provisionally-fixing member 4, is brought to the car-assembling line.

In this car-assembling line, the spring 7 on the room lamp 1 is brought into resilient abutting engagement with the fixing portion 10 of the roof reinforcing member 3 to thereby completely fix the roof sub-assembly (including the room lamp 1 and the roof trim 2) to the roof reinforcing member 3 by the completely-fixing member 5. At this time, the engagement claw 14 will not interfere with a horizontal portion 18 of the roof reinforcing member 3 thanks to the provision of the notch 13 in the roof reinforcing member 3. With this room lamp-mounting structure, the room lamp 1 and the roof trim 2 can thus be simultaneously fixed to the roof reinforcing member 3 in the car-assembling line, and therefore the time and labor, required for the assembling operation in the car-assembling line, can be reduced.

In the related room lamp-mounting structure shown in FIGS. 10 and 11, however, in case the claw portion 7d of the spring 7, before set on the fixing portion 10, escapes downward (toward the car room) at the time of fixing the room lamp 1 and the roof trim 2 to the roof reinforcing member 3 by the completely-fixing member 5. As a result, an inner surface (upper surface in the drawings) of the roof trim 2 abuts against a room-side surface (lower surface in the drawings) of the roof reinforcing member 3 as shown in FIG. 12A, there is a fear that the claw portion 7d fails to be brought into resilient abutting engagement with the fixing portion 10 of the roof reinforcing member 3, so that the spring 7 remains in a half-fixed condition.

Therefore, in order to prevent the spring 7 from being held in such a half-fixed condition, a clearance t need to be formed between the fixing portion 10 and the claw portion 7d when the inner surface of the roof trim 2 is brought into abutting engagement with the room-side surface of the roof reinforcing member 3 as shown in FIG. 12B. However, when this clearance t is large, there is a fear that the roof sub-assembly is shaken by vibrations or others during the travel of the car, and produces abnormal sounds.

Further, in the case of the spring 7 of the fixing member 5, when there is applied a large external force tending to displace the roof sub-assembly (including the room lamp 1 and the roof trim 2) toward the room (downward in the drawings) relative to the roof reinforcing member 3, the claw portion 7d is liable to be turned up as shown in FIG. 12C, and therefore the retaining force is small, which leads to a fear that the fixed condition is canceled.

SUMMARY OF THE INVENTION

It is therefore an object of this invention to solve the above problems, and more specifically to provide a improved lamp unit mounting structure which enables a lamp unit and an interior wall member to be easily and positively mounted simultaneously on a car body panel.

In order to achieve the above object, according to the present invention, there is provided a lamp unit mounting structure, comprising:

a mounting panel having a mounting portion;

a lamp unit;

an elastic fixing member, provided on the lamp unit, and including:

a first portion which is extended from the lamp unit;

a second portion which has a substantially U-shape, and has a first end being integrally connected to the first portion;

a third portion which is extended from a second end of the second portion toward the lamp unit; and an engagement portion which engages the mounting portion of the mounting panel; and a restricting member, provided on the lamp unit, and restricting a movement of the elastic fixing member in a mounting and dismounting direction of the engagement portion relative to the mounting panel, wherein:

the restricting member has an escape portion which allows a movement of the elastic fixing member toward the lamp unit.

Preferably, the third portion of the elastic fixing member is disposed in a first position when the engagement portion is not engaged with the mounting panel. The third portion of the elastic fixing member is moved to a second position when the engagement portion is abutted against the mounting panel. The third portion of the elastic fixing member is moved to the first position by elastic restoring force of the elastic fixing member after the engagement portion is engaged with the mounting panel. The restricting member allows the movement of the elastic fixing member toward the lamp unit by the escape portion in the first position. The restricting member restricts the movement of the elastic fixing member in the mounting and dismounting direction in the second position.

Preferably, the engagement portion has an upper projection and a lower projection on each of both side faces thereof. The restriction member has a retaining wall which is slidably fitted between the upper projection and the lower projection. The escape portion is provided between the retaining wall and the upper and lower projections.

In the above configurations, at the time of mounting a module (formed by attaching the lamp unit to an interior wall member) on a vehicle body panel by the elastic fixing member, the elastic fixing member is elastically deformed such that the engagement portion can be brought into and out of engagement with the mounting portion of the mounting panel. At this time, the restriction member, engaged with the upper and lower projections, prevents the engagement portion from being displaced in the direction of mounting and dismounting.

Therefore, when mounting the lamp unit and the interior wall member (combined together to form the module) simultaneously on the mounting panel, the engagement portion of the elastic fixing member will not escape toward a vehicle room in the direction of mounting and dismounting before the engagement portion is retainingly engaged with the mounting portion of the mounting panel. Therefore, in the fixing member, the engagement portion will not fail to be retainingly engaged with the mounting portion of the mounting panel, and hence is prevented from being held in a half-fixed condition, so that the module can be positively mounted on the mounting panel. And besides, when mounting the module on the vehicle body, the engagement portion will not escape toward the car room in the direction of mounting and dismounting, and therefore an excessive clearance for allowing for this escape does not need to be formed between the engagement portion and the mounting portion of the mounting panel.

Even when there is applied a large external force tending to displace the fixed module toward the room relative to the mounting panel, the engagement portion, prevented from displacement in the direction of mounting and dismounting, is prevented from being turned up, and therefore the fixed condition will not be canceled.

When an excessive upward force acts on the lamp unit after the mounting operation is completed, the upper and lower projections can be displaced without interference with the retaining wall thanks to the provision of the escape portion, and therefore there can be avoided a situation in which the elastic fixing member strikes against a body roof to recess it.

Preferably, a projecting length of the upper projection is smaller than that of the lower projection. A notch is formed in the retaining wall, and which allows the upper projection to pass through the notch and which restrict the lower projection to pass through the notch.

In the above configuration, when an upward force acts on the lamp unit, the upper projection will not interfere with the retaining wall thanks to the provision of the notch in the restriction member, and therefore the lamp unit can be displaced, thereby allowing this force to escape. On the other hand, when a downward force acts on the lamp unit, the lower projection interferes with the retaining wall to restrict the displacement, thereby preventing the downward movement of the lamp unit, and therefore the lamp unit can be positively mounted in such a manner that the shaking of the lamp unit is prevented.

Preferably, the retaining wall has a tapering portion disposed adjacent to the notch.

Preferably, the retaining wall is inclined.

In the above configurations, when the lamp unit begins to be mounted at a lamp-mounting window, the elastic fixing member abuts against the lamp-mounting window to be elastically deformed inwardly, so that the upper and lower projections move toward the retaining wall of the restriction member. At this time, thanks to the provision of the tapering portion formed at the notch-side end of the retaining wall, the retaining wall is smoothly inserted between the pair of engagement projections, and is slidably fitted therebetween.

BRIEF DESCRIPTION OF THE DRAWINGS

The above objects and advantages of the present invention will become more apparent by describing in detail preferred exemplary embodiments thereof with reference to the accompanying drawings, wherein:

FIG. 5 is a longitudinal cross-sectional view explanatory of a process of mounting the lamp unit of FIG. 1 on a car body panel;

DETAILED DESCRIPTION OF THE PREFERRED EMBODIMENTS

Figure 1:
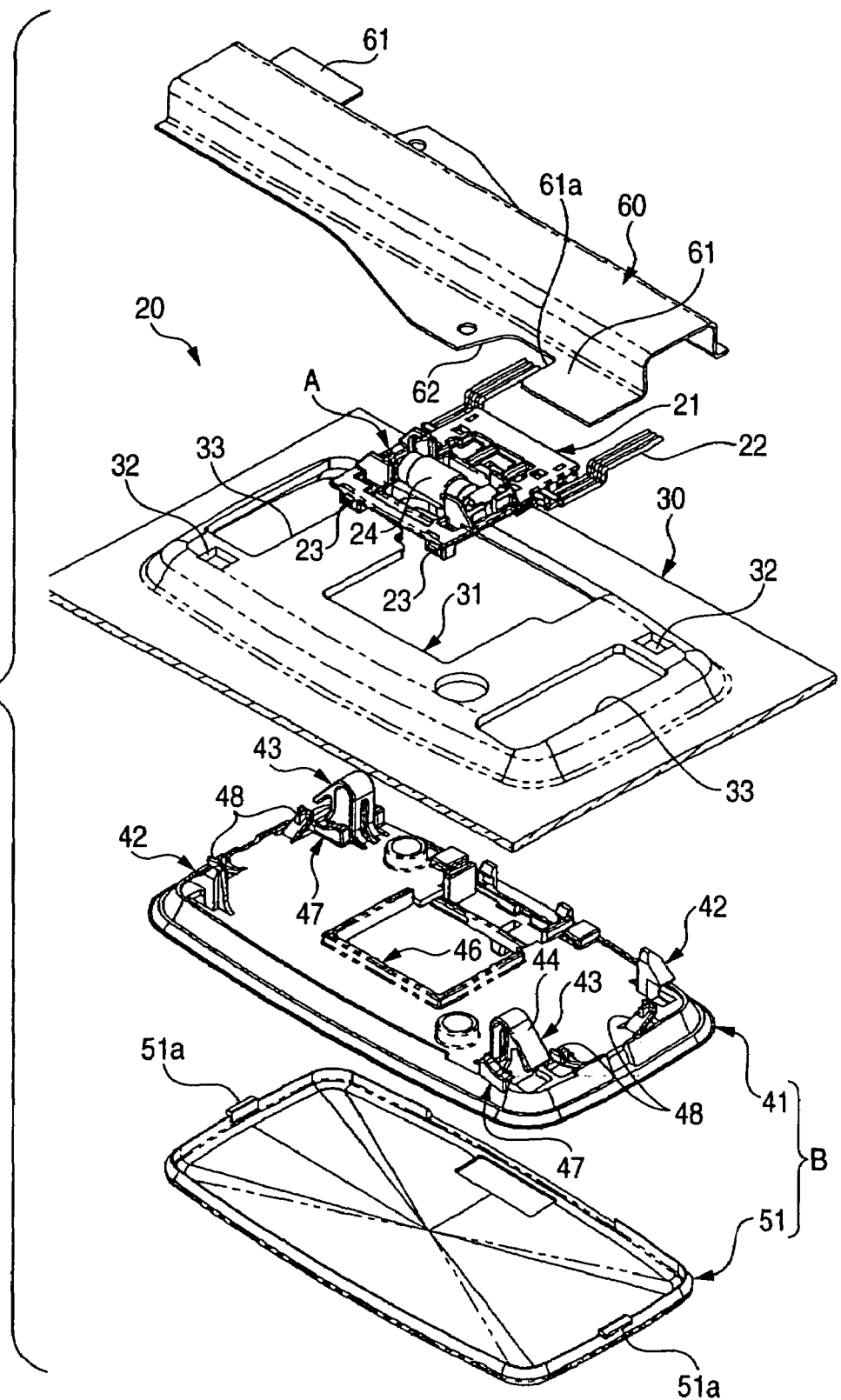
FIG. 1 is an exploded, perspective view of a room lamp to which one preferred embodiment of a lamp unit mounting structure of the present invention is applied.
Figure 2A:
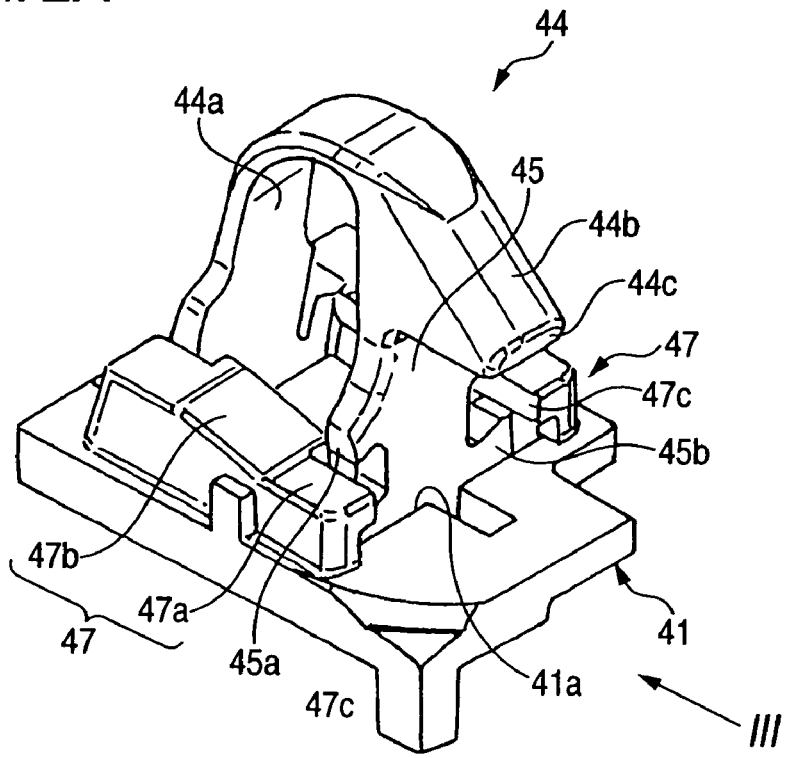
FIG. 2A is an enlarged perspective view of an important portion of fixing member shown in FIG. 1.
Figure 2B:
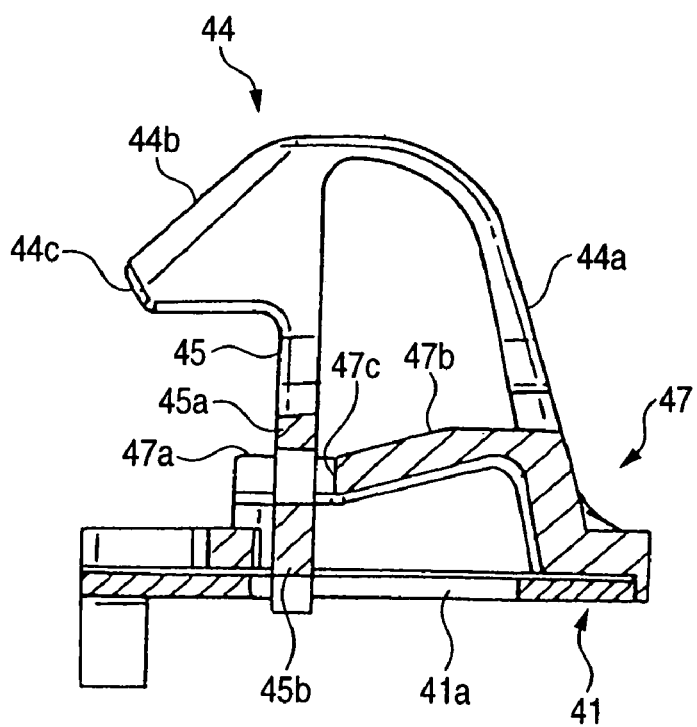
FIG. 2B is a cross-sectional view thereof.
Figure 3:
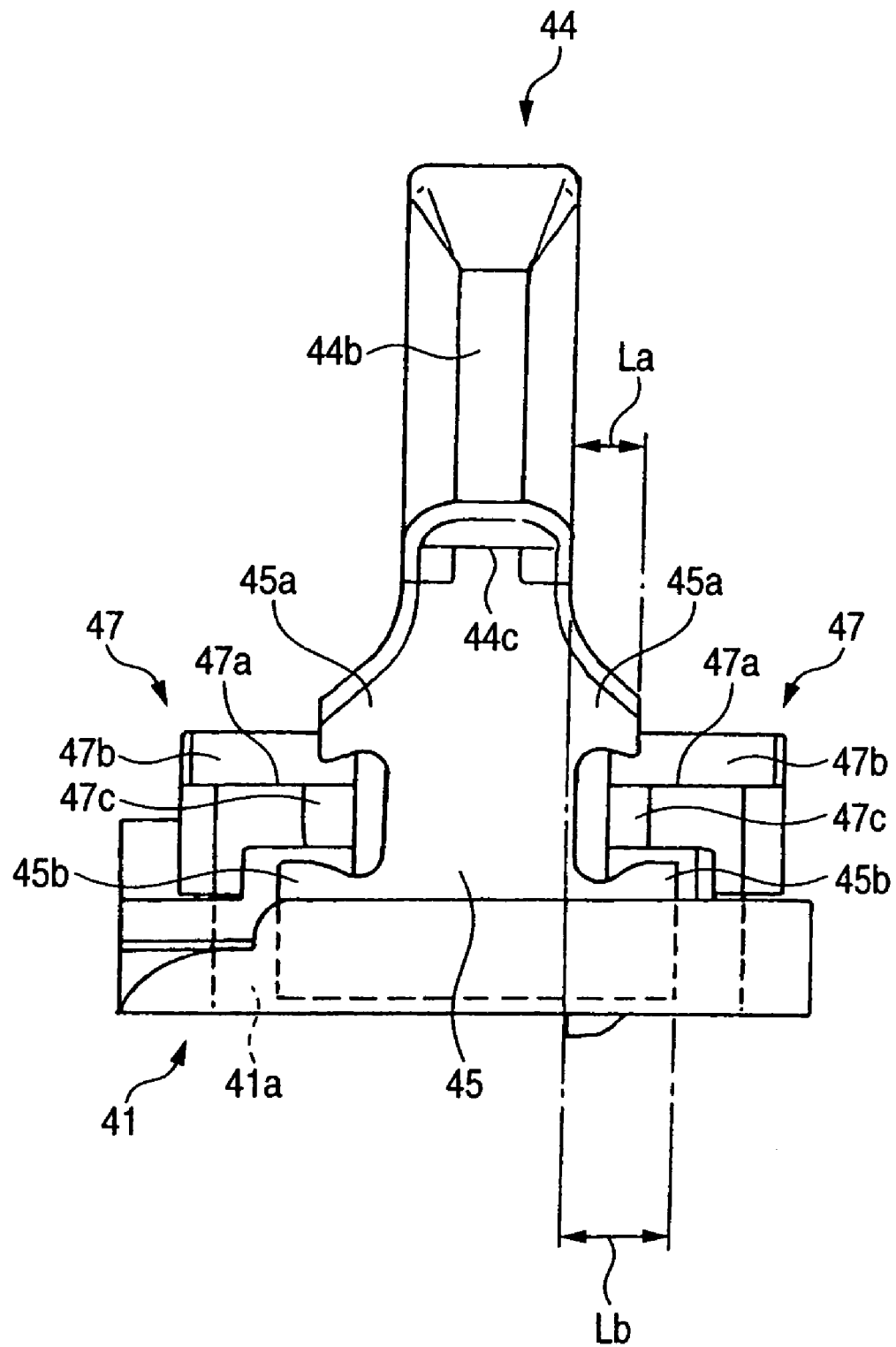
FIG. 3 is a front-elevational view as seen from a direction III of FIG. 2A.
Figure 4A:
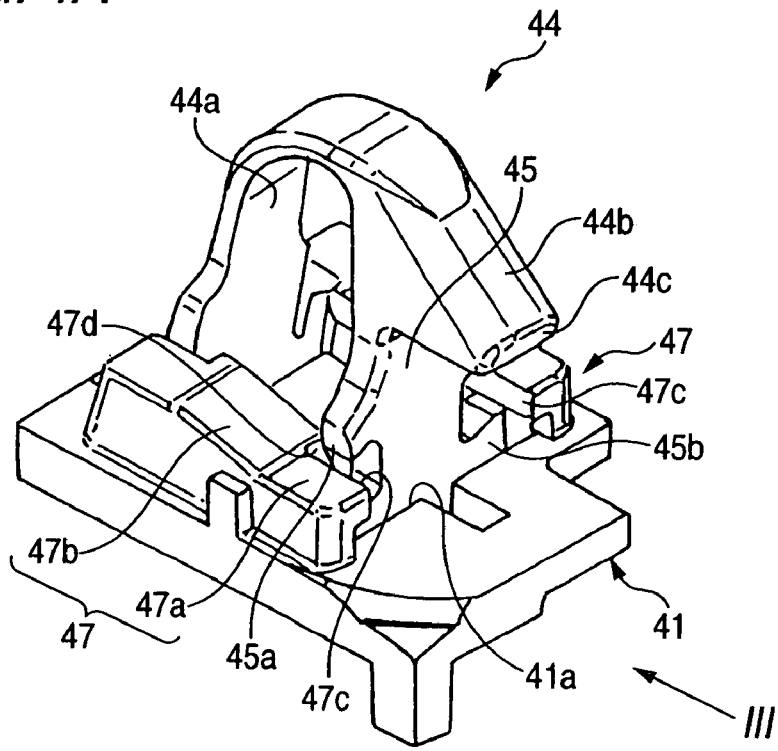
FIG. 4A is an enlarged perspective view of an important portion of modified fixing member.
Figure 4B:
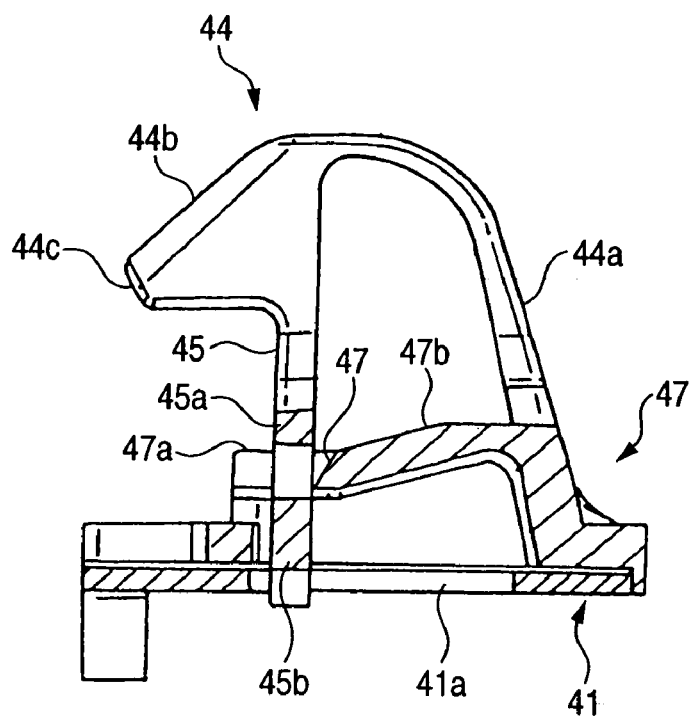
FIG. 4B is a cross-sectional view thereof.
Figure 6:
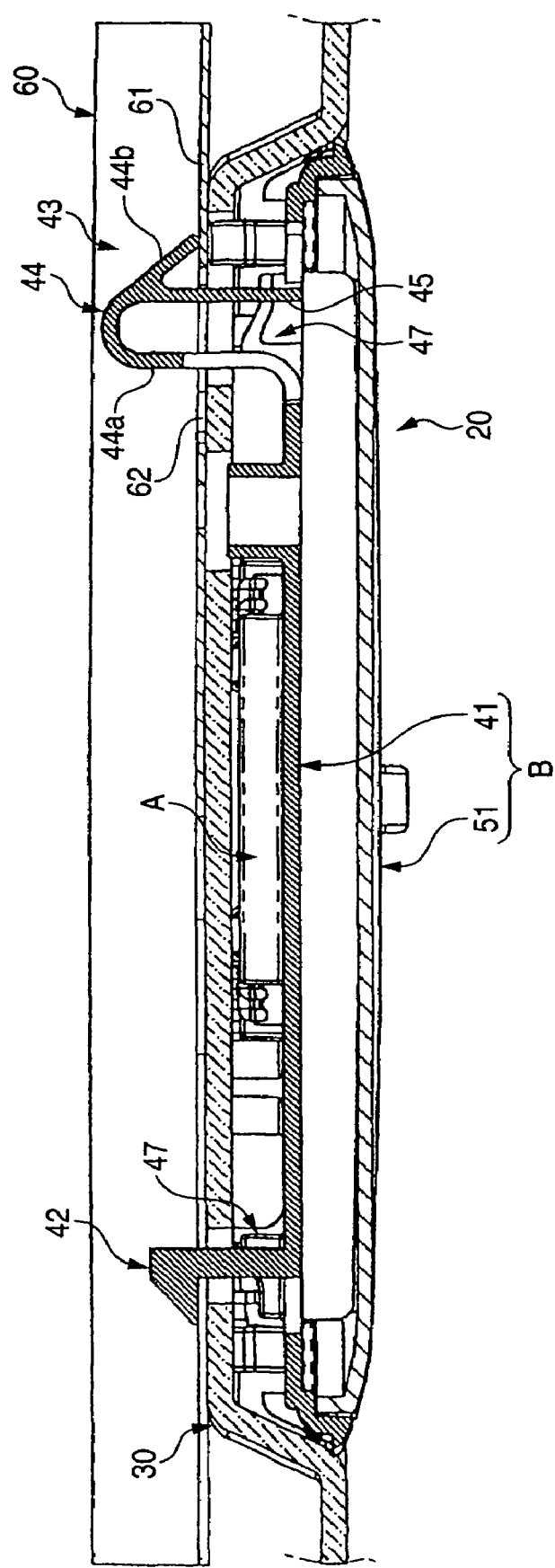
FIG. 6 is a longitudinal cross-sectional view explanatory of the process of mounting the lamp unit of FIG. 1 on the car body panel.
Figure 7:
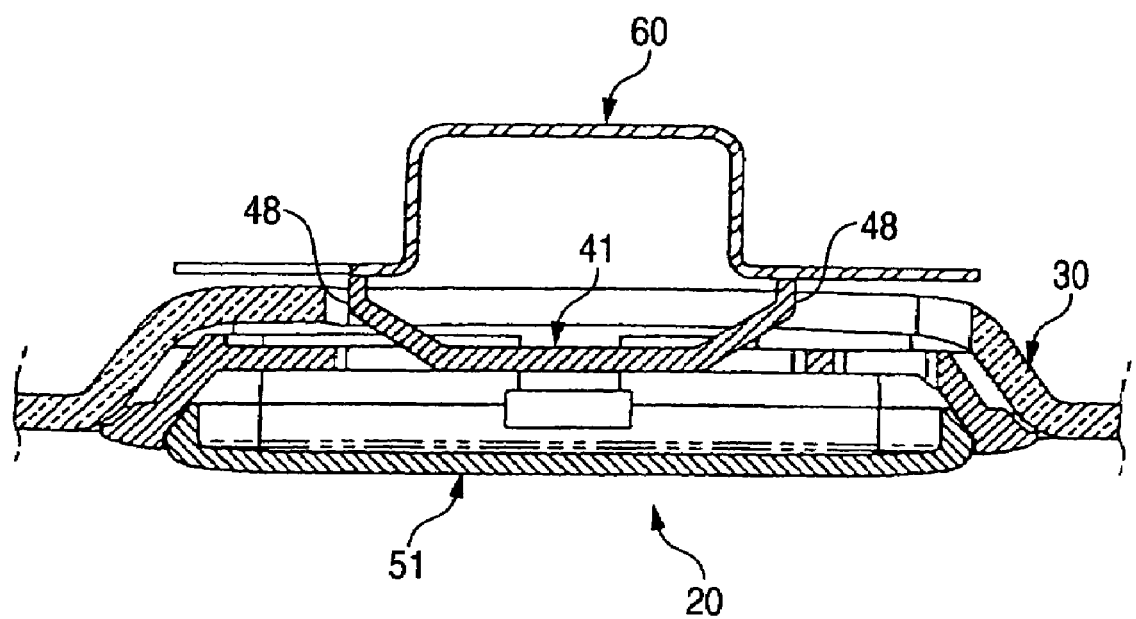
FIG. 7 is a transverse cross-sectional view explanatory of a process of mounting the lamp unit of FIG. 1 on the car body panel.

One preferred embodiment of a lamp unit mounting structure of the present invention will now be described in detail with reference to the accompanying drawings. FIG. 1 is an exploded, perspective view of a room lamp to which one preferred embodiment of the lamp unit mounting structure of the invention is applied, FIG. 2A is an enlarged perspective view of an important portion of a fixing member shown in FIG. 1, FIG. 2B is a cross-sectional view thereof, FIG. 3 is a front-elevational view as seen from a direction III of FIG. 2A, FIG. 4A is an enlarged perspective view of an important portion of a modified example of the fixing member shown in FIG. 2A, FIG. 4B is a cross-sectional view thereof, and FIGS. 5 to 7 are cross-sectional views explanatory of a process of mounting the lamp unit of FIG. 1 on a car body panel.

The room lamp 20 according to the embodiment, shown in FIG. 1, is a lamp unit which is adapted to be mounted at a lamp-mounting window 31 formed on a roof trim 30 (serving as an interior wall member) covering a body roof (car body panel). The room lamp 20 includes a lamp function portion A for mounting on that side (upper side in the drawings) of the roof trim 30 facing the body roof, and a design portion B for mounting on that side (lower side in the drawings) of the roof trim 30 facing the room, the lamp function portion A including a bulb 24 mounted in a housing 21, a switch portion (not shown) and so on, while the design portion B includes a cover lens 51, and a holder 41.

An FFC 22 (which is a cable forming a roof harness) is connected via the switch portion (not shown) to the bulb 24 mounted in the housing 21 of the lamp function portion A. Namely, a connection portion of the FFC 22 (which is the roof harness beforehand installed on the roof trim 30) is electrically connected to a wire connection portion of the lamp function portion A, and at this time the operator can effect this connecting operation with his face directed downward while confirming this connected condition with the eyes.

The cover lens 51 of the design portion B is integrally attached to the holder 41 by engaging retaining projections 51a respectively with engagement portions (not shown) of the holder 41. The holder 41 includes engagement claws 42 for engagement respectively in engagement holes 32 (formed through the roof trim 30) to fix the holder 41 and the roof trim 30 to each other, a housing fitting hole 46 for fittingly receiving the housing 21, a fixing member 43 for fixing the room lamp 20 and a reinforcing member 60 of the body roof to each other, and shake-prevention piece portions 48 for being brought into resilient abutting engagement with the reinforcing member 60 after the mounting of the room lamp on the car body so as to prevent the shaking of the room lamp.

The pair of engagement claws 42 are provided on a diagonal line of the holder 41 having a generally rectangular shape when viewed from the top, and also the pair of fixing member 43 are provided on another diagonal line of the holder 41. Two pairs of shake-prevention piece portions 48 are formed integrally on the holder 41, and each pair of shake-prevention piece portions 48 are provided along a corresponding short side of the holder 41, and extend obliquely upwardly.

As shown in FIG. 2A, each fixing member 43 is formed on and projects perpendicularly from that side (upper side in the drawings) of the holder 41 (of the room lamp 20) facing the reinforcing member 60. This fixing member 43 includes an elastic arm 44 for retaining engagement at its distal end portion 44c with a mounting portion 61 of the reinforcing member 60, and a pair of elastic arm restriction portions 47 provided respectively on opposite (right and left) sides of the elastic arm 44. The mounting portion 61 is formed by an edge portion of a notch 62 formed in the reinforcing member 60.

The elastic arm 44 includes a vertical portion 44a formed integrally at its proximal end with the holder 41, an elastic portion 44b which extends from the vertical portion 44a, and is bent into a generally inverted U-shape to extend obliquely downwardly, and a support piece portion 45 extending vertically downwardly from a lower surface of the elastic portion 44b. The distal end portion 44c of the elastic portion 44b is adapted to be retainingly engaged with the mounting portion 61 of the reinforcing member 60. A distal end portion (lower end portion) of the support piece portion 45 extends through a notch portion 41a formed on the holder 41, and is not fixed, and therefore is in a free condition. A pair of upper and lower engagement projections 45a and 45b are formed on and project outwardly from each of opposite side edges of the support piece portion 45, these upper and lower engagement projections serving as the engagement portions of the elastic arm 44. As shown in FIG. 3, the amount La of projecting of each upper engagement projection 45a is smaller than the amount Lb of projecting of each lower engagement projection 45b.

Each elastic arm restriction portion 47, formed (molded) integrally on the holder 41, includes a retaining wall 47a, and a slanting portion 47b.

As shown in FIGS. 2A and 2B, a notch 47c (serving as an escape portion) is formed in the retaining wall 47a, and each lower engagement projection 45b extends laterally beyond the notch 47c to a position beneath the corresponding retaining wall 47a since the amount Lb of projecting of the lower engagement projection 45b is large. The amount La of projecting of each upper engagement projection 45a is small, and therefore the upper engagement projection 45a is within the range of the notch 47c. Therefore, in a non-deformed condition of the elastic arm 44, that is, before the room lamp 20 is mounted or after the room lamp is properly mounted, the lower engagement projections 45b of the elastic arm 44 abut respectively against the lower surfaces of the retaining walls 47a, and therefore the elastic arm 44 is prevented from being deformed upwardly. On the other hand, each upper engagement projection 45a is within the range of the corresponding notch 47c, and therefore the upper engagement projection 45a will not interfere with the retaining wall 47c upon downward deformation of the elastic arm, thereby allowing the downward deformation of the elastic arm.

Further, each pair of upper and lower engagement projections 45a and 45b are disposed respectively at upper and lower sides of the corresponding slanting portion 47b, and therefore can slide along the slanting portion 47b, but are prevented from movement in a direction perpendicular to the slanting portion 47b. Therefore, during the mounting of the room lamp on the car body, the distal end portion 44c is prevented from being displaced in a direction (upward-downward direction in the drawings) of mounting and dismounting of the room lamp 20 relative to the car body, but can slide along the slanting portions 47b. Therefore, the elastic arm 44 can be deformed along the slanting portions 47b, and therefore the room lamp 20 can be mounted on and removed from the car body.

Although a starting end of each slanting portion 47b is cut vertically as shown in FIGS. 2A and 2B, a tapering portion 47d may be formed at this portion as shown in FIGS. 4A and 4B. In this case, the engagement projections 45a and 45b, disposed in registry with the notch 47c, can smoothly move to the slating portion 47b. And besides, even if the support piece portion 45 is slightly engaged with the slanting portion 47b of each elastic arm restriction portion 47 after the mounting operation is completed, each engagement projection 45a slides over the tapering portion 47d to move to the notch 47c when an apex portion 44d of the elastic arm 44 abuts against the body roof upon application of an upward force to the room lamp 20. Thus, the engagement projection 45a is disengaged from the slanting portion 47b, and therefore the upward force is prevented from acting on the body roof. In FIGS. 4A and 4B, the same portions as described above are designated by identical reference numerals, respectively, and repeated description will be omitted.

When the room lamp 20 of this embodiment is to be mounted on the roof trim 30, first, the holder 41 is attached to the roof trim 30 to cover the lamp-mounting window 31 in the roof trim 30, and the engagement claws 42 on the holder 41 are engaged respectively in the engagement holes 32 in the roof trim 30, thereby fixing the holder 41 and the roof trim 30 to each other. At this time, the fixing member 43 and the shake-prevention piece portions 48 will not interfere with the roof trim 30 thanks to the provision of openings 33 in the roof trim 30 (see FIG. 5). The cover lens 51 is attached to the holder 41 from the inside of the car room (that is, from the lower side in FIG. 1), so that the design portion B is beforehand attached to the roof trim 30.

Then, the housing 21, forming the lamp function portion A of the room lamp 20 connected to the connection portion of the FFC 22, is fitted into the housing fitting hole 46 in the holder 41 from that side (upper side in the drawings) of the roof trim 30 facing the reinforcing member 60, and trim mounting portions 23 are retainingly engaged with a peripheral edge portion of the lamp-mounting window 31, so that the lamp function portion A is directly mounted on the roof trim 30 as shown in FIG. 5. The cover lens 51 may be attached to the holder 41 after the housing 21 is fitted into the housing fitting hole 46 in the holder 41.

Then, the FFC 22 is installed on that side of the roof trim 30 facing the reinforcing member 60, and roof accessories (not shown) such as a back mirror and a sun visor are beforehand attached to the roof trim 30, thereby forming a roof module in which the room lamp 20 and the roof trim 30 with the roof accessories are integrally combined together as shown in FIG. 5.

Then, the roof module, having the room lamp 20 and the roof trim 30 integrally combined together, is mounted on the body roof as shown in FIGS. 6 and 7. At this time, the distal end portions 44c of the elastic arms 44, disposed at that side where the room lamp 20 is provided, are retainingly engaged respectively with the mounting portions 61 of the reinforcing member 60, and by doing so, the room lamp 20 and the roof trim 30 are fixed to the reinforcing member 60 by the fixing member 43.

In the lamp unit mounting structure of this embodiment, the mounting operation is thus completed merely by mounting the roof module (having the room lamp 20 and the roof trim 30 integrally combined together) on the reinforcing member 60 of the body roof, and the operation for mounting the roof accessories can be omitted when mounting the roof trim, and therefore the mounting operation is easy.

Particularly, the fixing member 43 enable the room lamp 20 and the roof trim 30 to be easily and positively mounted simultaneously on the reinforcing member 60 of the body roof by their elastic arms 44 and elastic arm restriction portions 47. Namely, in the fixing member 43 of this embodiment, the pair of engagement projections 45a and 45b, formed at each of the opposite side edges of the support piece portion 45 of the elastic arm 44, are disposed in registry with the notch 47c (formed in the retaining wall 47a of the elastic arm restriction portion 47 formed integrally with the holder 41) as shown in FIG. 2B before the room lamp is mounted.

Figure 8A:
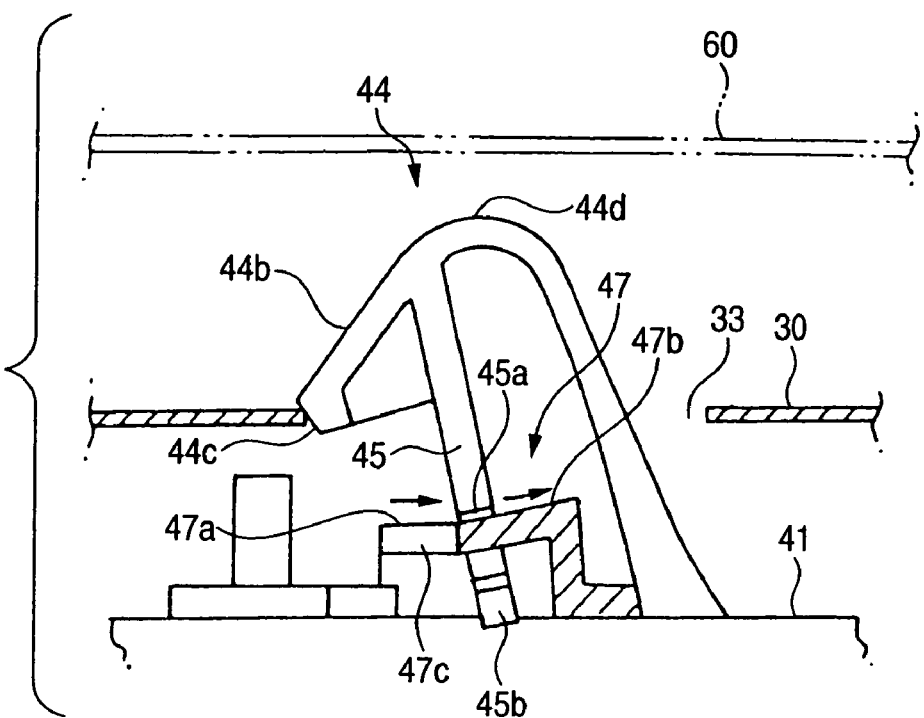
FIGS. 8A and 8B are enlarged cross-sectional view of an important portion, explaining the operation of the fixing member of FIG. 2.

When the elastic portion 44b of the elastic arm 44 abuts against an edge 61a of the mounting portion 61 as shown in FIG. 8a during the mounting of the roof module on the reinforcing member 60, the elastic portion 44b is pressed downward, so that the support piece portion 45 is pressed down rearwardly (in a right-hand direction in FIG. 8A). As a result, the slanting portion 47b of each elastic arm restriction portion 47 is fitted between the corresponding pair of upper and lower engagement projections 45a and 45b formed on the support piece portion 45. Therefore, the elastic arm 44 is prevented from being deformed downwardly, and moves rearward. When the roof module is further pushed up, the support piece portion 45 moves rearward, and the distal end of the elastic arm 44 also moves rearward, and therefore the distal end portion 44c of the elastic arm 44 slides past the edge 61a, and is retainingly engaged with the mounting portion 61, so that the roof module is mounted on the reinforcing member 60.

Therefore, when mounting the room lamp 20 and the roof trim 30 (combined together to form the module) simultaneously on the reinforcing member 60, the distal end portion 44c of the elastic arm 44 will not escape toward the car room (that is, downward) in the direction of mounting and dismounting of the room lamp 20 relative to the car body before this distal end portion 44c is retainingly engaged with the mounting portion 61 of the reinforcing member 60. Therefore, in the fixing member 43, the distal end portion 44c of the elastic arm 44 will not fail to be retainingly engaged with the mounting portion 61 of the reinforcing member, and hence is prevented from being held in a half-fixed condition, so that the module can be positively mounted on the reinforcing member 60.

And besides, when mounting the module on the car body, the distal end portion 44c of the elastic arm 44 will not escape toward the car room in the direction of mounting and dismounting of the room lamp 20 relative to the car body as described above, and therefore an excessive clearance for allowing for this escape does not need to be formed between the distal end portion 44c and the mounting portion 61 of the reinforcing member 60.

Furthermore, at the time of mounting the module on the reinforcing member 60 of the body roof, the elastic portion 44b is elastically deformed such that its distal end portion 44c is moved toward the vertical portion 44a, and hence is displaced so as to be releasably engaged with the mounting portion 61, and at the same time this distal end portion 44c is also displaced toward the reinforcing member 60 (that is, upward). Therefore, the distal end portion 44c can be displaced upwardly beyond its normal position, and therefore can positively slide past the edge 61a of the mounting portion 61.

Figure 12A:
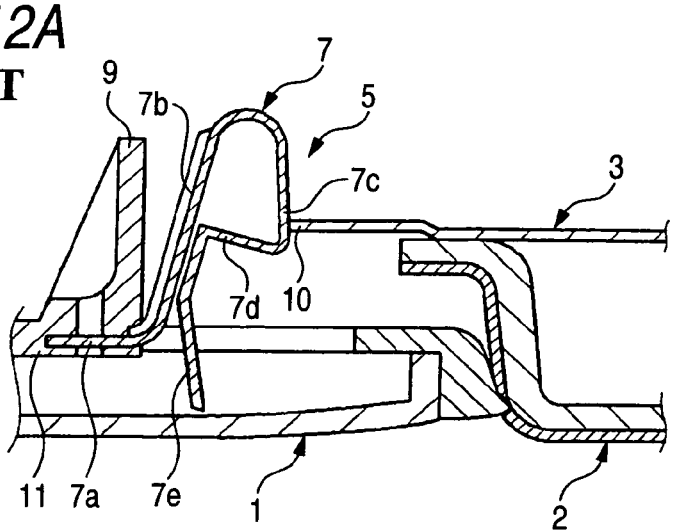
FIG. 12A thru 12C are enlarged cross-sectional views of an important portion explanatory of the operation of the completely-fixing member of FIG. 10.
Figure 12B:
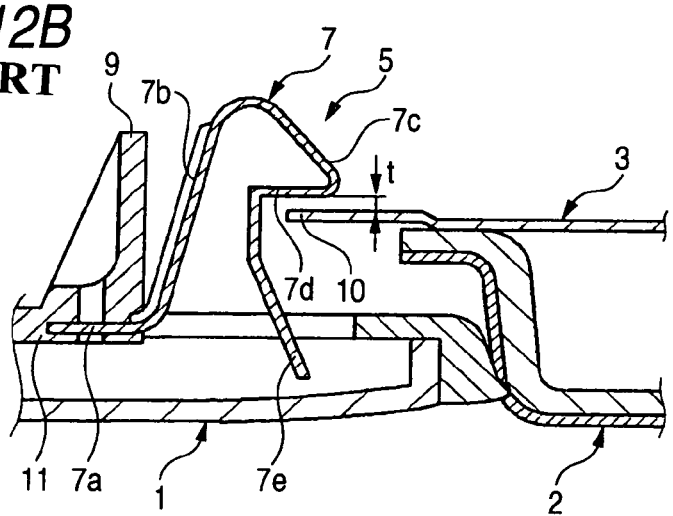
Figure 12C:
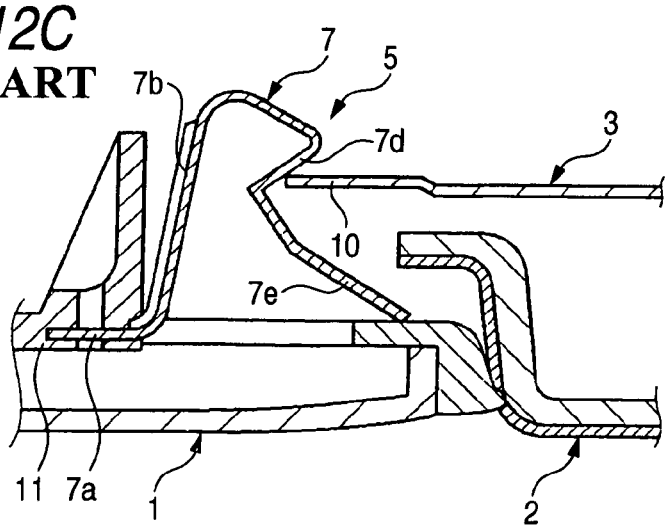

Therefore, the distal end portion 44c can be positively engaged with the mounting portion 61 without the need for providing a clearance (as described above for the related room lamp-fixing structure of FIG. 12B in which the clearance t is needed) between this distal end portion 44c and the mounting portion 61 after the module is completely mounted on the car body.

When the distal end portion 44c slides past the edge 61a as shown in FIG. 6, the slanting portions 47b cease to urge the elastic portion 44b upward, so that the distal end portion 44c tends to be restored into its normal condition. Therefore, a resilient force is produced in the elastic portion 44b when the module is completely mounted on the car body, and the elastic portion 44b resiliently abuts against the mounting portion 61, so that the module is prevented from shaking relative to the reinforcing member 60.

In this embodiment, the shake-prevention piece portions 48 are provided at the holder 41 of the room lamp 20, and are resiliently abut against the reinforcing member 60 after the module is mounted on the car body as shown in FIGS. 5 and 6. Therefore, for example, even when a clearance due to a molding error of the elastic arm 44 and an assembling tolerance is formed between the distal end portion 44c and the mounting portion 61, the shake-prevention piece portions 48 positively prevent the shaking of the module relative to the reinforcing member 60. Therefore, the module will not be shaken by vibrations or others during the travel of the car, and therefore will not produce abnormal sounds.

Figure 8B:
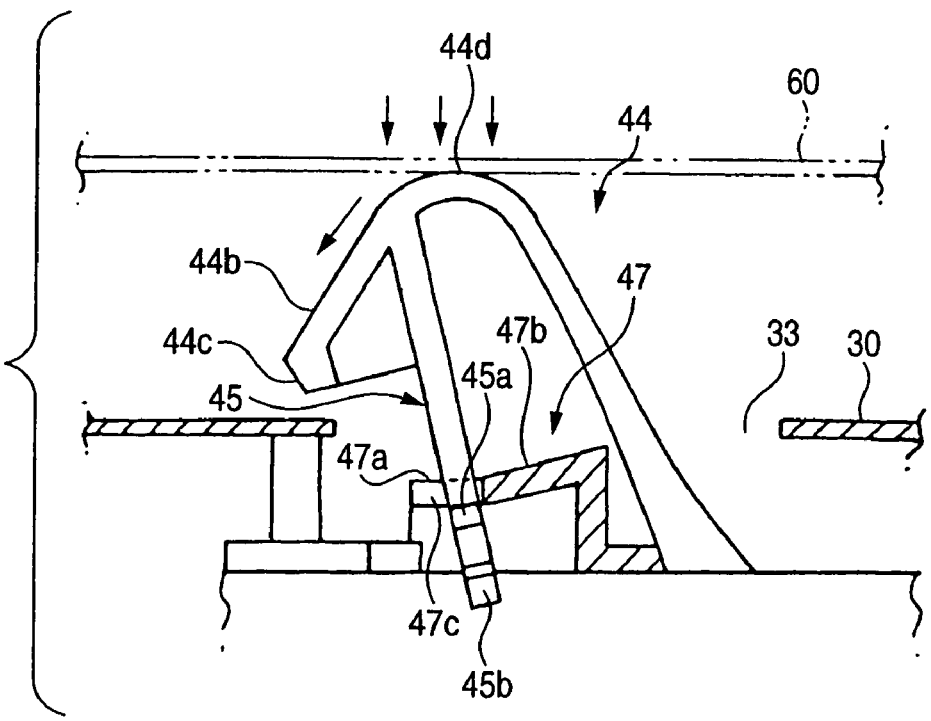

When an excessive upward force acts on the room lamp 20 after the mounting operation is completed, there is a fear that the apex portion 44d of each elastic arm 44 strikes against the body roof. However, the support piece portion 45 is located in the notches 47c formed respectively in the elastic arm restriction portions 47, and each engagement projection 45a will not interfere with the retaining wall 47a, so that the elastic arm 44 is allowed to be deformed downward as shown in FIG. 8B. Therefore, the upward force is absorbed, thereby avoiding a situation in which the body roof is recessed.

Figure 9A:
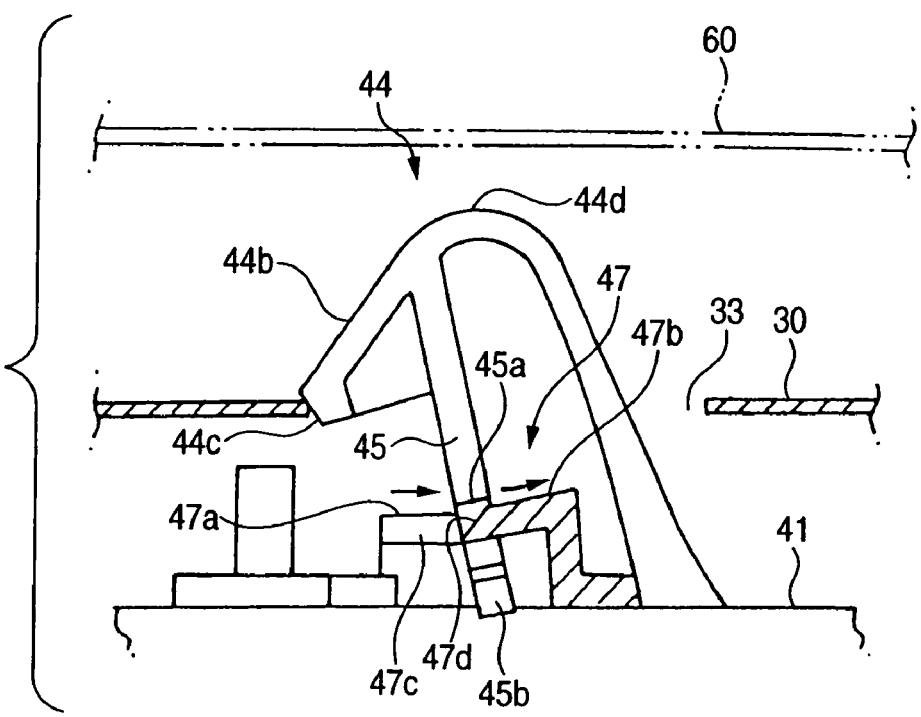
FIGS. 9A and 9B are cross-sectional views showing an operation when a tapering portion is provided at a retaining wall.
Figure 9B:
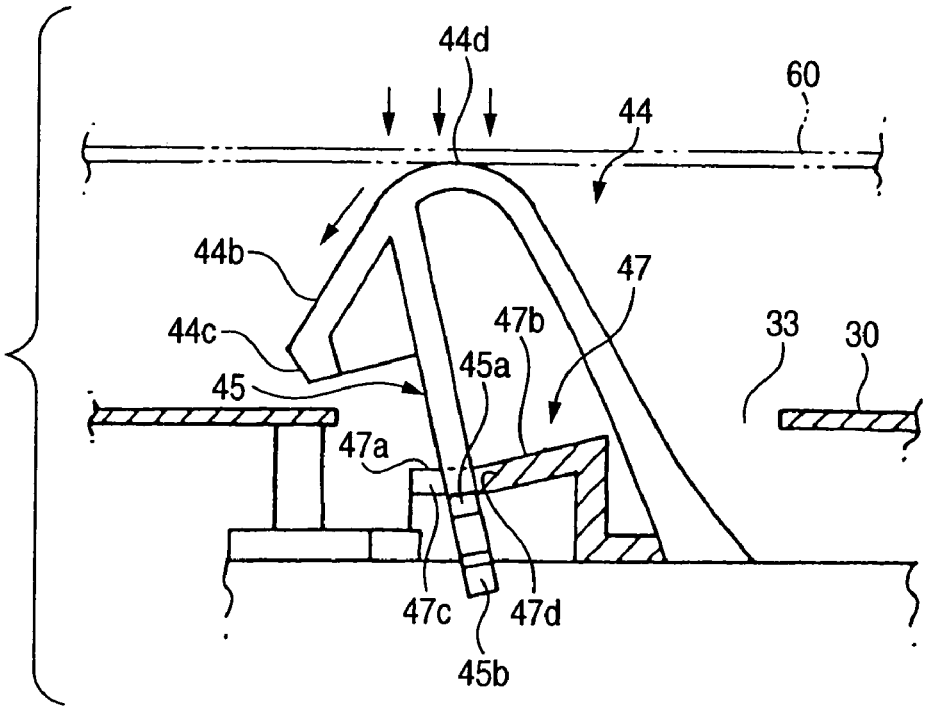
Figure 10:
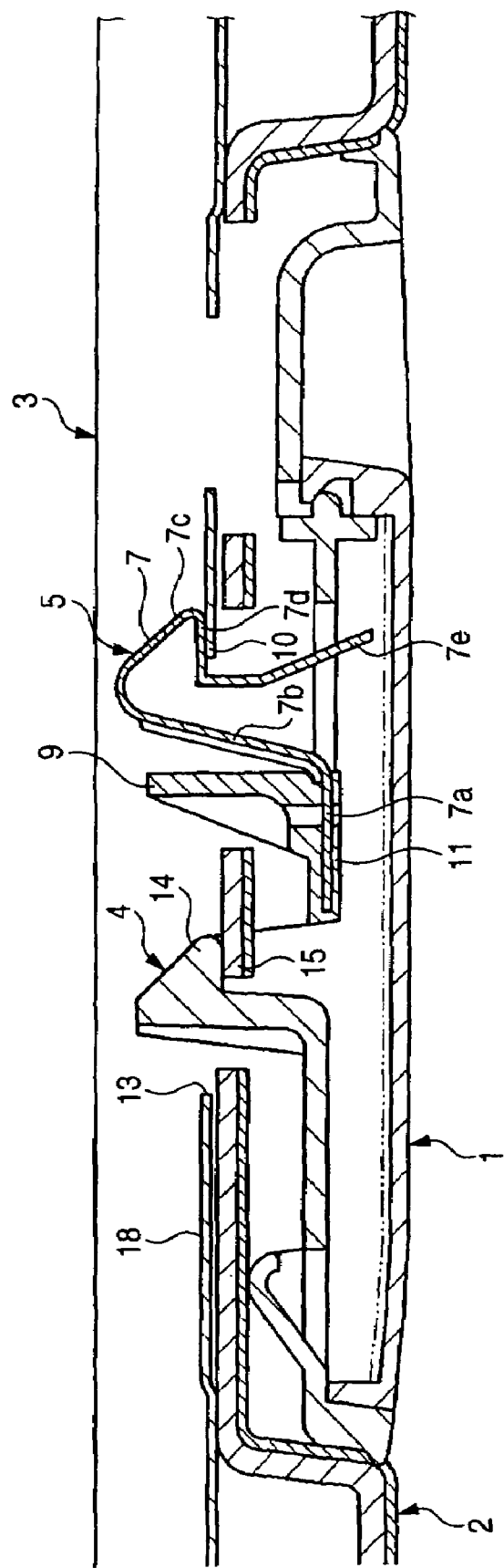
FIG. 10 is a longitudinal cross-sectional view explanatory of a related lamp unit mounting structure.
Figure 11:
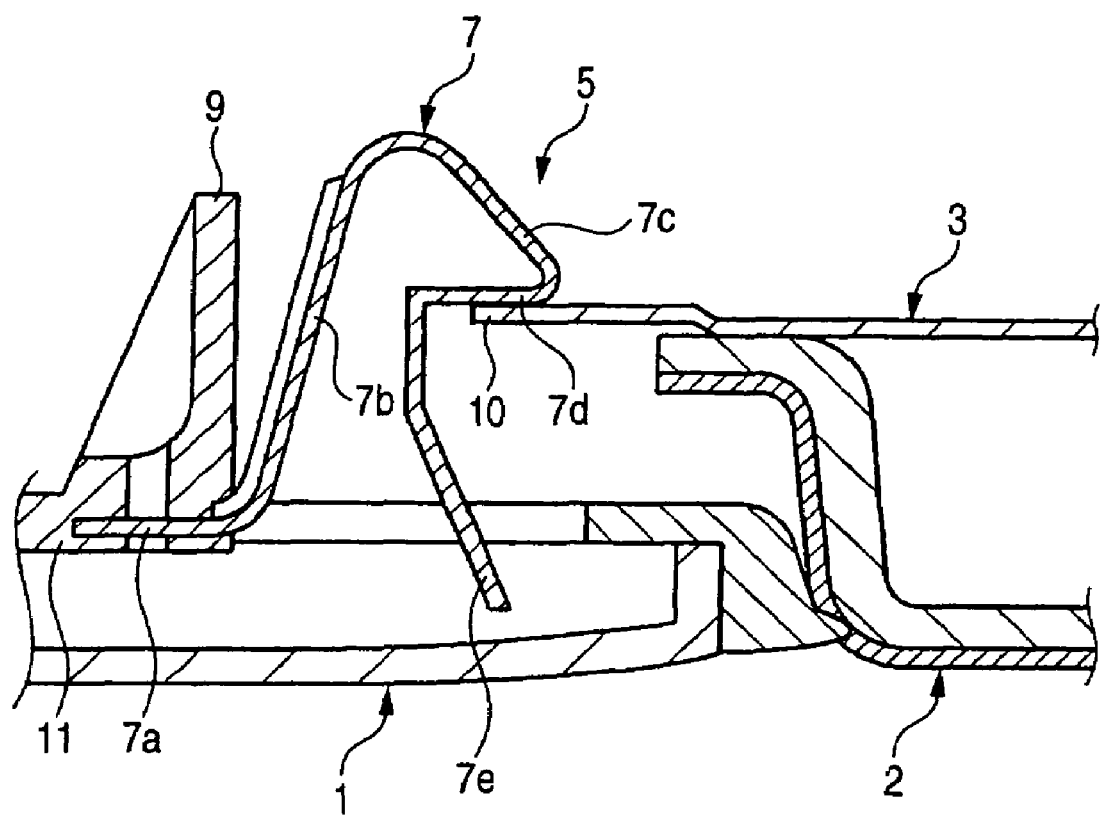
FIG. 11 is an enlarged cross-sectional view of an important portion of completely-fixing member shown in FIG. 10.

In the case where the tapering portion 47d is formed at that end portion of the retaining wall 47a disposed adjacent to the notch 47c as shown in FIGS. 4A and 4B, the engagement projections 45a and 45b, disposed in registry with the notch 47c, can smoothly move to the slanting portion 47b as shown in FIG. 9A. And besides, even if the support piece portion 45 is slightly engaged with the slanting portion 47b of each elastic arm restriction portion 47 after the mounting operation is completed, each engagement projection 45a slides over the tapering portion 47d to move to the notch 47c when the apex portion 44d of the elastic arm 44 abuts against the body roof upon application of an upward force to the room lamp 20, as shown in FIG. 9B.

Even when there is applied a large external force tending to displace the module (fixed to the reinforcing member 60 of the body roof as shown in FIGS. 5 and 6) toward the room (downward in the drawings) relative to the roof reinforcing member 60, the lower wide engagement projections 45b (formed on and projecting from the support piece portion 45 of the elastic arm 44), each laterally extending beyond the corresponding notch 47c, abut respectively against the lower surfaces of the retaining walls 47a of the elastic arm restriction portions 47, and therefore the distal end portion 44c can hardly be displaced upward in the direction (upward-downward direction in the drawings) of mounting and dismounting of the room lamp 20 relative to the car body. Therefore, the distal end portion 44c of the elastic arm 44 is prevented from being turned up, and the retaining force is enhanced, so that the fixed condition will not be canceled.

The car body panel, interior wall member, lamp unit, wire connection portion, wires, etc., of the lamp unit mounting structure of the invention are not limited to their respective constructions shown in the above embodiment, and each of these can take any other suitable form on the basis of the subject matter of the invention. For example, in the above embodiment, although the room lamp, serving as the lamp unit, is attached to the roof trim serving as the interior wall member, the invention can be applied also to the cases where a map lamp is attached to a roof trim and where a lamp unit such as a courtesy lamp is attached to a door trim serving as an interior wall member covering a car body panel such as a door panel. The cable (wires) to be installed on the interior wall member is not limited to the FFC described in the above embodiment, and a flat circuit member, such as an FPC (flexible printed circuit board) and a ribbon cable, and a wire harness can be used.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A lamp unit mounting structure, comprising:

a mounting panel, having a mounting portion;

a lamp unit;

an elastic fixing member, provided on the lamp unit, and including:

a first portion which is extended from the lamp unit;

a second portion which has a substantially U-shape, and has a first end being integrally connected to the first portion;

a third portion which is extended from a second end of the second portion toward the lamp unit; and an engagement portion which engages the mounting portion of the mounting panel; and a restricting member, provided on the lamp unit, and restricting a movement of the elastic fixing member in a mounting and dismounting direction of the engagement portion relative to the mounting panel, wherein:

the restricting member has an escape portion which allows a movement of the elastic fixing member toward the lamp unit.

2. The lamp unit mounting structure as set forth in claim 1, wherein:

the third portion of the elastic fixing member is disposed in a first position when the engagement portion is not engaged with the mounting panel;

the third portion of the elastic fixing member is moved to a second position when the engagement portion is abutted against the mounting panel;

the third portion of the elastic fixing member is moved to the first position by elastic restoring force of the elastic fixing member after the engagement portion is engaged with the mounting panel;

the restricting member allows the movement of the elastic fixing member toward the lamp unit by the escape portion in the first position; and the restricting member restricts the movement of the elastic fixing member in the mounting and dismounting direction in the second position.

3. The lamp unit mounting structure as set forth in claim 1, wherein:

the third portion has an upper projection and a lower projection on each of both side faces thereof;

the restriction member has a retaining wall which is slidably fitted between the upper projection and the lower projection; and the escape portion is provided between the retaining wall and the upper and lower projections.

4. The lamp unit mounting structure as set forth in claim 3, wherein:
   a projecting length of the upper projection is smaller than that of the lower projection; and
   the escape portion is a notch formed in the retaining wall, which allows the upper projection to pass through the notch and which restricts the lower projection to pass through the notch.

5. The lamp unit mounting structure as set forth in claim 4, wherein the retaining wall has a tapering portion disposed adjacent to the notch.

6. The lamp unit mounting structure as set forth in claim 3, wherein the retaining wall is inclined.

* * * * *